United States Patent
Stolz

[11] 3,911,801
[45] Oct. 14, 1975

[54] VENTILATING SYSTEM FOR PASSENGER SPACE OF A VEHICLE, ESPECIALLY OF A MOTOR VEHICLE

[75] Inventor: Albert Stolz, Tubingen-Pfrondorf, Germany

[73] Assignee: Daimler-Benz Aktiengesellschaft, Germany

[22] Filed: Aug. 15, 1973

[21] Appl. No.: 388,659

[30] Foreign Application Priority Data
Aug. 17, 1972 Germany.......................... 2240446

[52] U.S. Cl. .................... 98/2.12; 98/2.18; 98/20
[51] Int. Cl.² ........................ B60J 1/20; B60H 1/24
[58] Field of Search ......... 98/2.04, 2.05, 2.06, 2.07, 98/2.12, 2.08, 2.18, 20; 62/243, 244

[56] References Cited
UNITED STATES PATENTS

| | | | |
|---|---|---|---|
| 2,096,577 | 10/1937 | Drake | 98/2.18 |
| 2,667,113 | 1/1954 | Ackemans | 98/2.18 |
| 3,274,915 | 9/1966 | Ziegenfelder | 98/2.04 |
| 3,286,617 | 11/1966 | Shirk | 98/2.04 |
| 3,750,555 | 8/1973 | Gotz | 98/2.12 |

Primary Examiner—William E. Wayner
Assistant Examiner—Henry C. Yuen
Attorney, Agent, or Firm—Craig & Antonelli

[57] ABSTRACT

A ventilation system for the passenger space of a vehicle, especially of a motor vehicle which is provided within its rear area with access apertures for the ventilation exhaust air; channels lead from these access apertures to a ventilation discharge installation which is connected with one or several exhaust air discharge apertures of the vehicle outer body covering; the flow resistance of the air paths leading to the exhaust air discharge apertures is thereby variable as a function of the preselected operating conditions and/or the exhaust air discharge openings are located at places in the outer covering panels of the body of the vehicle, where mutually different dynamic pressures occur during the drive.

16 Claims, 1 Drawing Figure

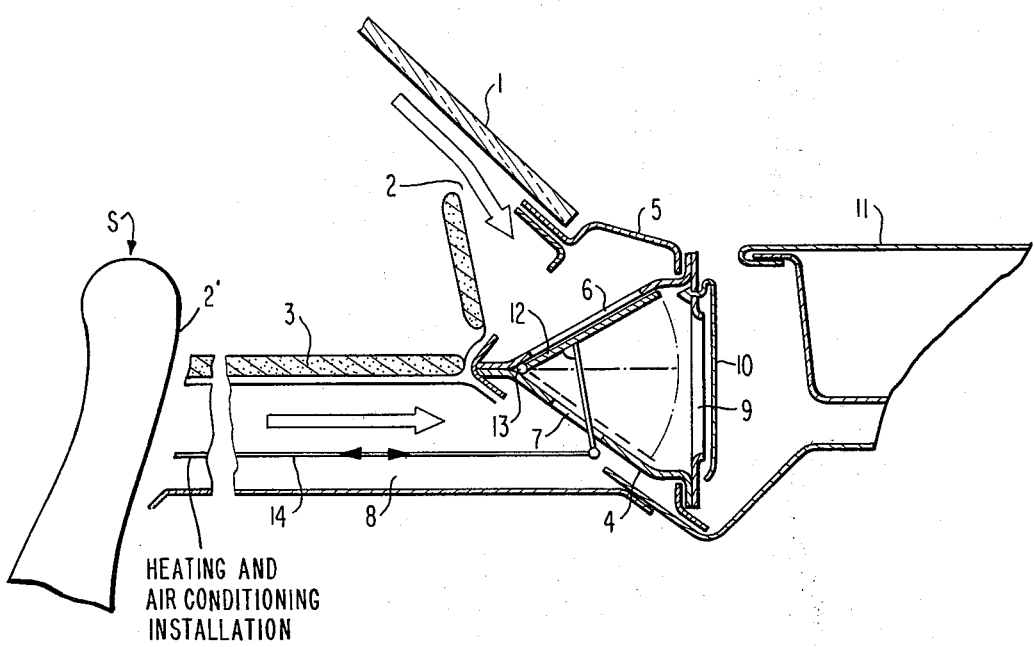
HEATING AND
AIR CONDITIONING
INSTALLATION

VENTILATING SYSTEM FOR PASSENGER SPACE OF A VEHICLE, ESPECIALLY OF A MOTOR VEHICLE

The present invention relates to a ventilating system for the passenger space of a vehicle, especially of a motor vehicle, which is provided within its rearward area with access apertures for the ventilation exhaust air, from which channels or the like lead to a ventilation discharge system which is connected to one or several exhaust air discharge openings of the vehicle outer body covering.

In order to obtain an increased driving comfort, one aims in the automobile construction at constantly maintaining the same air pressure in the passenger space independently of the operating conditions of a heating and/or air conditioning installation and independently of the respective driving velocities, which air pressure should be somewhat higher than the maximum atmospheric pressure which exists on the outside of leakage places of the passenger space. It is prevented thereby that unheated or uncooled air flows-in from the outside which might disturb the comfort of the vehicle passengers.

In order to so heat the passenger space of a vehicle moving with difficult velocities that the desired interior temperature is maintained independently of the driving velocity, a rate of flow of outside air which increases with the driving velocity has to be provided for the passenger space. This rate of air flow must be relatively high in order that the air is able to cool off only slightly while flowing through the passenger space so that the temperatures occurring at the different locations of the passenger spacr deviate only slightly from the average desired air-temperature. A pressure drop occurs in the ventilation discharge of the passenger space by reason of the high rate of air flow and by reason of the resistances inherent therein.

If the vehicle is operated with an air conditioning installation, then normally only that proportion of outside air is admixed to the supplied air blown into the passenger space by means of a fan or the like, which is required for covering the oxygen need of the passengers. The most significant proportion of the supplied air therefore consists under this operating condition of re-circulated air. Only a considerably smaller quantity of air per time unit has to be carried off toward the outside by the ventilation discharge system under these conditions so that a considerably smaller pressure drop establishes itself in the ventilation discharge.

The prior art ventilation systems are, for that reason, not in a position to maintain the same air pressure in the vehicle passenger space during the described operating conditions.

Added to the two described operating conditions is in many vehicles still another, third operating condition, in which a pure ventilation without heating or cooling of the supplied air is to be undertaken for the passenger space. In that case as large as possible a rate of outside air flow is to be aimed at, whereas the pressure within the vehicle passenger space may, under certain circumstances, be smaller than in the other operating conditions because the ventilation can be further enhanced by outside air entering at certain leakage places.

The present invention is concerned with the task to provide a ventilating system of the type described above which permits to maintain during the described operating conditions at least approximately the same air pressure within the passenger space. The present invention essentially consists in that the flow resistance of the air paths leading to the exhaust air discharge aperture or apertures can be changed in dependence on operating conditions that can be selected. It becomes possible by this construction to maintain a far-reaching constant pressure in the passenger space also with strongly differing exhaust air quantities per time unit because the pressure drop in the ventilation system can be kept relatively high also with a relatively small exhaust-air quantity.

In another solution provision is made that the ventilating installation is adapted to be connected in dependence on preselected operating conditions respectively with one or several exhaust discharge apertures or openings which are provided at those places of the outer body covering of the vehicle, where mutually differing dynamic pressures occur during the drive. Also as a result thereof, the interior pressure of the passenger space can be kept far-reachingly constant notwithstanding the changing exhaust air quantity.

In one advantageous embodiment of the present invention at least two access or admission apertures for the exhaust air are provided, which are connected by way of separate channels with the ventilating discharge installation. As a result thereof, two separate air paths are created by the access apertures to the ventilating discharge installation which can be constructed and designed for the desired air resistance conditions in a simple manner by simple constructive measures.

Provisions is thereby made in one appropriate embodiment that at least one access aperture is arranged within the area of the rear window and at least one access aperture within the area of the seating surface of rear seats of the vehicle. Additional advantages result therefrom for the individual operating conditions.

The access aperture disposed within the area of the rear window pane is utilized for the heating operation, which access aperture is located farthest removed from the air inlet, normally disposed at least in the front area of the passenger space or forwardly thereof, so that far-reachingly all areas of the passenger space are reached by the warm-air flow. In the case of air-conditioning, a quantity of air corresponding to the supplied air proportion and stored within the area of the rear leg spaces escapes through an access opening in proximity to the seating surfaces of the rear seat. Additionally, the advantage results that with a pure ventilation, an air removal or discharge is realized at as many locations of the passenger space as possible so that the draft appearances which are otherwise unavoidable with a high rate of air flow can be considerably reduced.

In one structurally advantageous embodiment of the present invention, the ventilation discharge installation consists of an insert triangular in cross section which includes in two side walls thereof inlet apertures coordinated to the access apertures and adapted to be closed by an air flap and a discharge aperture in the third wall. This insert is arranged structurally advantageously on the inside of a cross bearer disposed below the rear window pane.

According to a further feature of the present invention, provision may be made that the air flap is connected with an adjusting member which is operatively connected with an adjusting member of a heating and- /or air conditioning installation of the vehicle. The possibility results therefrom to automatically adjust the ventilation discharge into the most appropriate position dependent on the respective operating conditions.

Accordingly, it is an object of the present invention to provide a ventilation system for the vehicle passenger space of a vehicle, especially of a motor vehicle, which avoids by simple means the aforementioned shortcomings and drawbacks encountered in the prior art.

Another object of the present invention resides in a ventilation system for the passenger space of vehicles which permits the air pressure to be maintained at least far-reachingly constant within the passenger space under all operating conditions.

A further object of the present invention resides in a ventilation system for the passenger space of vehicles in which substantially the same air pressure can be maintained in the vehicle passenger space regardless of the operating conditions of the associated heating and/or air conditioning systems.

Still a further object of the present invention resides in a ventilation system for the passenger space of vehicles in which a far-reachingly constant pressure can be maintained in the vehicle passenger space notwithstanding pronounced fluctuations in the quantity of air discharged per time unit.

Another object of the present invention resides in a ventilation system which permits a substantially draft-free ventilation, which is being maintained even while the heating and/or air-conditioning installation is turned on.

A further object of the present invention resides in a ventilation system of the type described above which is simple in construction, yet highly effective for its intended function.

These and other objects, features, and advantages of the present invention will become more apparent from the following description of the present invention, when taken in connection with the accompanying drawing, which shows, for purposes of illustration only, one embodiment in accordance with the present invention, and wherein:

The single figure is a schematic partial cross-sectional view of a passenger motor vehicle through the rear end of a passenger space within the area of the lower edge of the rear window which is equipped with a ventilation system according to the present invention.

The interior pressure of a passenger space of a vehicle moving with differing velocities can be approximately expressed by the following equation:

$$p_i = \frac{p_E}{q} \cdot \frac{V^2}{16} + C_E \cdot G_{LE}^2$$

wherein $p_i$ = static pressure in the passenger space in $kg/m^2$, $\frac{p_E}{q}$ = ratio of the static pressure to the dynamic pressure at the place of the air discharge of the ventilation system out of the outer body covering, $V$ = driving velocity in $\frac{M}{sec}$, $C_E$ = resistance coefficient of the ventilation system in $$\frac{Kg \cdot sec^2}{m^2 \cdot Kg^2},$$

$G_{LE}$ = rate of outside air flow flowing out as a result of the ventilation in kg/sec, $1/16 \sim \gamma/2g$ of the air with a frequently present condition of the air in $$\frac{kg \cdot sec^2}{m^4}$$

whereby $g$ = acceleration due to earth's gravity ($m/sec^2$) and $\gamma$ = specific weight of air, for which a frequently accepted value in practice is about 1.23 $kg/m^3$.

It is apparent from this equation that the internal pressure in the passenger space can be kept the same or at least positive at a very different rate of flow of outside air flowing out of the ventilation system if the resistance coefficient of the ventilation and/or the ratio of the static pressure to the dynamic pressure at the place of the air-discharge out of the outer body covering can be made very different. This can be achieved in that exhaust-air discharge apertures are provided at several places of the vehicle outer body covering, at which very different dynamic pressures occur at the same driving velocities, which exhaust-air discharge apertures are connected to the ventilation system corresponding to the adjusted operating condition. If the exhaust-air discharge apertures or openings of the outer body covering of the vehicle are not intended to be changed, then the same effect can be obtained by changing the resistance coefficient of the channel system of the ventilation. Additionally, it is possible to combine with each other these two measures for purposes of achieving an optimum effect.

It will suffice in practice if at least two different adjustments of the ventilation system are possible in that case the extreme conditions can already be at least approximately controlled. For constructive reasons, that solution appears to be more favorable according to which the resistance coefficients of the channel system of the ventilation discharge are changed. The advantage is then also obtained above all that the removal of the exhaust air can be undertaken at different places of the passenger space under different operating conditions, whence the comfort can be still further increased.

Referring now to the single figure of the drawing, two different air paths for the exhaust air to be discharged are provided in this figure, which have a differing flow resistance or very different resistance coefficients. An access aperture 2 is provided within the area of the lower edge of a rear window pane 1 of a passenger motor vehicle. This access aperture 2, which is delimited by a padded hat storage shelf 3, leads to a ventilation discharge installation which consists of an insert 4 that is arranged on the inside of a cross bearer member 5 extending underneath the lower edge of the rear window pane 1. The insert 4 has a cross section in the form of a triangle with an apex directed forwardly. One lateral wall contains an inlet aperture 6 which is coordinated to the access aperture 2. The lateral wall disposed therebelow contains an inlet aperture 7 which is connected by way of a channel or duct 8 with a further access aperture 2' within the area of the seating surface of the rear seats S of the vehicle. The rear wall of the insert 4 contains an outlet aperture 9 which is covered off by a conventional rubber check-valve or back-pressure-valve 10. The rear hood 11 of the vehicle adjoins the cross bearer 5 by way of a gap so that the outlet aperture 9 is directly connected with the outer body covering of the vehicle.

An air valve of flap 12 which is mounted on the inside of the insert 4, is pivotally supported about a pivot pin 13 disposed at the abutment place of the two lateral walls containing the inlet apertures 6 and 7 or about a hinge of any conventional construction arranged in the same location. The air valve 12 is adjustable by way of a linkage 14 in such a manner that it can be displaced from the illustrated position into a center position shown in dash and dot lines and into an end position illustrated in dash lines.

The flow paths are so laid out and constructed in the illustrated embodiment that the flow resistances and therewith the resistance coefficients are very different. This is indicated in the drawing in that the inlet aperture 6 is kept considerably larger than the inlet aperture 7.

For heating operation, the air valve 12 is displaced into the position shown in dash lines in which it closes the inlet aperture 7 and opens up the inlet aperture 6. The access aperture 2 is then so located that the air stream flows along the rear window pane 1. This arrangement is thereby valid for a rear window pane inclined opposite the driving direction. An oppositely inclined rear window pane would require that the access aperture 2 be arranged within the area of the upper edge of such window. The access aperture 2 of the exhaust air is thus located at the place farthest removed from the inlet aperture (not shown) of the outside air so that the warm air stream can reach the largest part of the vehicle passenger space.

For the operating condition "air-conditioning" the air valve 12 is displaced into the illustrated position in which it closes the inlet aperture 6 and opens up the inlet aperture 7. In this operating condition, only a relatively slight amount of exhaust air is carried off which corresponds to the supplied outside air proportion that is to far-reachingly cover only the oxygen requirement of the vehicle passengers. This quantity of exhaust air is branched off preferably within the area of the rear leg space of a passenger motor vehicle which generally is scavenged only slightly. By reason of the increased flow resistance or of the higher resistance coefficient, which is schematically indicated by the smaller inlet aperture 7, the interior pressure of the vehicle passenger space remains constant or at least positive, even though the quantity of exhaust air to be discharged is considerably reduced.

For the operating condition of a pure ventilation, i.e., when both the heating and air conditioning installations are turned off, it is appropriate if the ventilation outflow as also the ventilation in-flow occur at as many places of the passenger space as possible in order to suppress the draft appearances otherwise unavoidable at the high rate of air flow. In this operating condition, the air valve 12 is displaced into the center position illustrated in dash and dot lines in which it opens up both inlet apertures 6 and 7. The further advantage results therefrom that the resistance coefficient is once more reduced so that a smaller interior pressure desirable under this operating condition will establish itself in the passenger space. This reduced interior pressure permits that an additional air-flow takes place by way of certain leakages of the passenger space.

The adjustment of the air valve 12 may also take place automatically in unison with the adjustment of a heating and air-conditioning installation of the vehicle. The adjusting member of the air valve 12 can be operatively connected for that purpose with an adjusting member of a recirculated-fresh air shifting device provided in this installation, for example, by way of vacuum lines, in such a manner that the illustrated position of the air valve 12 is obtained when one shifts to air conditioning. Additionally, the operative connection of the air valve 12 with the adjusting member of a hot water valve or cock of the heating system and with the recirculated air-fresh air shifting device may take place in such a manner that with a closed hot water valve and outside air operation, the position illustrated in dash and dot lines is obtained.

The different locations of the air discharge openings in the body covering where different dynamic pressures occur, may thereby be selected in accordance with well known principles, known as such in the art, and therefore not illustrated herein, especially as they also depend to some extent, as also well known, on the particular design and streamlining of the vehicle in question. Also conventional valve or flap means may be used to route the air flow under the selected condition to the corresponding air discharge openings. If such system is used in conjunction with the one shown in the single figure, then the selective air distribution system thereof, which may also be connected to the linkage 14, is located downstream of the discharge aperture 9.

While I have shown and described only one embodiment in accordancne with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A ventilation system for the passenger space of a vehicle which is provided within its rearward area with at least two access aperture means provided in the passenger space for permitting access of exhaust-air therefrom, a ventilation discharge means, separate channel means for connecting the respective access aperture means with said ventilation discharge means, at least one exhaust-air discharge aperture means connected with said ventilation discharge means for discharging the exhaust air, characterized by means for changing the flow resistance of air paths leading to the exhaust-air discharge aperture means in dependence on selectable operating conditions by permitting air to selectively flow from at least one of said access aperture means or simultaneously from both of said access aperture means to said exhaust-air discharge aperture means.

2. A ventilation system according to claim 1, characterized in that the exhaust-air discharge aperture means is formed by an opening in the outer body covering of the vehicle.

3. A ventilation system according to claim 2, characterized in that the ventilation discharge means is connected with several exhaust-air discharge aperture means.

4. A ventilation system for the passenger space of a vehicle which is provided within its rearward area with at least two access aperture means for the exhaust-air, from which separate channel means lead to a ventilation discharge means that is connected with at least one exhaust-air discharge aperture means, characterized by means for changing the flow resistance of air paths leading to the exhaust-air discharge aperture means in dependence on the selectable operating conditions, and in at least one access aperture means is arranged within the area of the rear window and at least one access aperture means within the area of the seating surfaces of the vehicle.

5. A ventilation system according to claim 4, characterized in that the ventilation discharge means includes an insert means which is triangularly shaped in cross section and includes two lateral walls provided with inlet aperture means coordinated to the access aperture means and adapted to be closed by an air valve means, and a discharge aperture means provided in the third wall of said insert means.

6. A ventilation system for a vehicle with a rear window according to claim 5, characterized in that the insert means is mounted on the inside of a cross bearer means disposed underneath the rear window.

7. A ventilation system according to claim 6, characterized in that the air valve means is pivotally supported in the area of abutment of the two lateral walls of the insert means containing the inlet aperture means.

8. A ventilation system according to claim 7, characterized in that a back-pressure valve means is inserted into the discharge aperture means of the insert means.

9. A ventilation system according to claim 8, characterized in that the air valve means is operatively connected with an adjusting member that is coupled with an adjusting member of at least one of a heating and air conditioning installation of the vehicle.

10. A ventilation system according to claim 9, characterized in that the exhaust-air discharge aperture means is formed by an opening in the outer body covering of the vehicle.

11. A ventilation system according to claim 10, characterized in that the ventilation discharge means is connected with several exhaust-air discharge aperture means.

12. A ventilation system for the passenger space of a vehicle which is provided within its rearward area with access aperture means for permitting access of exhaust-air from the passenger space, a ventilation discharger means, channel means for connecting said access aperture means with said ventilation discharge means, exhaust-air discharge aperture means connected with said ventilation discharge means for discharging the exhaust air, characterized in that several exhaust-air discharge aperture means are provided and formed by openings in the outer body covering of the vehicle, at least two access aperture means for the exhaust air are provided which are connected with the ventilation discharge means by way of a separate channel means, means are provided for changing the flow resistance of air paths leading to the exhaust-air discharge aperture means in dependence on selectable operating conditions, and in that the ventilation discharge means includes an insert means which is triangularly shaped in cross section and includes two lateral walls provided with inlet aperture means coordinated to the access aperture means and adapted to be closed by an air valve means, and a discharge aperture means provided in the third wall of said insert means.

13. A ventilation system for a vehicle with a rear window according to claim 12, characterized in that the insert means is mounted on the inside of a cross bearer means disposed underneath the rear window.

14. A ventilation system according to claim 12, characterized in that the air valve means is pivotally supported in the area of abutment of the two lateral walls of the insert means containing the inlet aperture means.

15. A ventilation system according to claim 12, characterized in that a back-pressure valve means is inserted into the discharge aperture means of the insert means.

16. A ventilation system according to claim 12, characterized in that the air valve means is operatively connected with an adjusting member that is coupled with an adjusting member of at least one of a heating and air conditioning installation of the vehicle.

* * * * *